United States Patent
Yamamoto et al.

(10) Patent No.: US 11,091,603 B2
(45) Date of Patent: Aug. 17, 2021

(54) RESIN COMPOSITION, AND MOLDING MATERIAL AND MULTILAYER STRUCTURE COMPRISING SAME

(71) Applicant: Mitsubishi Chemical Corporation, Tokyo (JP)

(72) Inventors: Nobuyuki Yamamoto, Tokyo (JP); Akira Ono, Tokyo (JP); Fumimasa Maki, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 41 days.

(21) Appl. No.: 16/561,502

(22) Filed: Sep. 5, 2019

(65) Prior Publication Data
US 2020/0002502 A1     Jan. 2, 2020

Related U.S. Application Data

(63) Continuation of application No. PCT/JP2018/008641, filed on Mar. 6, 2018.

(30) Foreign Application Priority Data

Mar. 6, 2017 (JP) .............. JP2017-041437

(51) Int. Cl.
*C08K 3/26* (2006.01)
*C08F 216/38* (2006.01)
(Continued)

(52) U.S. Cl.
CPC ............ *C08K 3/346* (2013.01); *B32B 27/306* (2013.01); *C08F 216/38* (2013.01); *C08K 3/26* (2013.01);
(Continued)

(58) Field of Classification Search
CPC ..... B32B 27/08; B32B 25/082; B32B 27/302; B32B 21/08; B32B 27/10; B32B 27/34;
(Continued)

(56) References Cited

U.S. PATENT DOCUMENTS 5,389,709 A    2/1995   Itamura et al.
5,492,953 A    2/1996   Itamura et al.
(Continued)

FOREIGN PATENT DOCUMENTS

CN    105237908       1/2016
JP    50-073942 A     6/1975
(Continued)

OTHER PUBLICATIONS

Extended European Search Report, European patent Office, Application No. 18763815.0, dated Feb. 21, 2020.
(Continued)

*Primary Examiner* — William K Cheung
(74) *Attorney, Agent, or Firm* — Greenblum & Bernstein, P.L.C.

(57) ABSTRACT

The present invention provides a resin composition having a high level of processability, which is a resin composition including a saponified ethylene-vinyl ester-based copolymer (A), a layered inorganic compound (B), and a carbonic acid salt (C) (provided that the carbonic acid salt (C) excludes the layered inorganic compound (B)).

4 Claims, 1 Drawing Sheet

(51) Int. Cl.
*C08K 3/34* (2006.01)
*B32B 27/30* (2006.01)

(52) U.S. Cl.
CPC .... *C08F 2800/10* (2013.01); *C08K 2003/267* (2013.01)

(58) Field of Classification Search
CPC ....... B32B 27/22; B32B 27/308; B32B 27/20; B32B 27/288; B32B 27/40; B32B 27/32; B32B 27/306; B32B 27/36; B32B 27/18; B32B 27/304; B32B 25/82; C08K 3/346; C08K 2003/267; C08F 216/38; C08F 2800/10
USPC ........................................................ 524/424
See application file for complete search history.

(56) References Cited

U.S. PATENT DOCUMENTS

| | | | |
|---|---|---|---|
| 5,747,633 | A | 5/1998 | Ito et al. |
| 6,353,048 | B1 | 3/2002 | Onishi et al. |
| 2006/0000956 | A1 | 1/2006 | Kamoshita et al. |
| 2006/0009561 | A1 | 1/2006 | Kamoshita et al. |
| 2011/0178222 | A1 | 7/2011 | Kani |
| 2017/0253721 | A1* | 9/2017 | Yoshida .................. C08K 3/346 |
| 2019/0010296 | A1* | 1/2019 | Hatanaka .................. B29B 9/12 |

FOREIGN PATENT DOCUMENTS

| | | |
|---|---|---|
| JP | 03-072541 A | 3/1991 |
| JP | 07-285528 A | 10/1995 |
| JP | 11-049901 A | 2/1999 |
| JP | 2000-026689 A | 1/2000 |
| JP | 2000-290457 A | 10/2000 |
| JP | 2002-137339 A | 5/2002 |
| JP | 2004-034616 A | 2/2004 |
| JP | 2004-136281 A | 5/2004 |
| JP | 2004-224845 A | 8/2004 |
| WO | 201608862 * | 6/2016 |
| WO | 2017110561 * | 6/2017 |

OTHER PUBLICATIONS

International Search Report issued in International Pat. Appl. No. PCT/JP2018/008641, dated Jun. 5, 2018.

Written Opinion of the International Searching Authority issued in International Pat. Appl. No. PCT/JP2018/008641, dated Jun. 5, 2018.

International Preliminary Report on Patentability, issued in International Pat. Appl. No. PCT/JP2018/008641, dated Sep. 10, 2019.

* cited by examiner

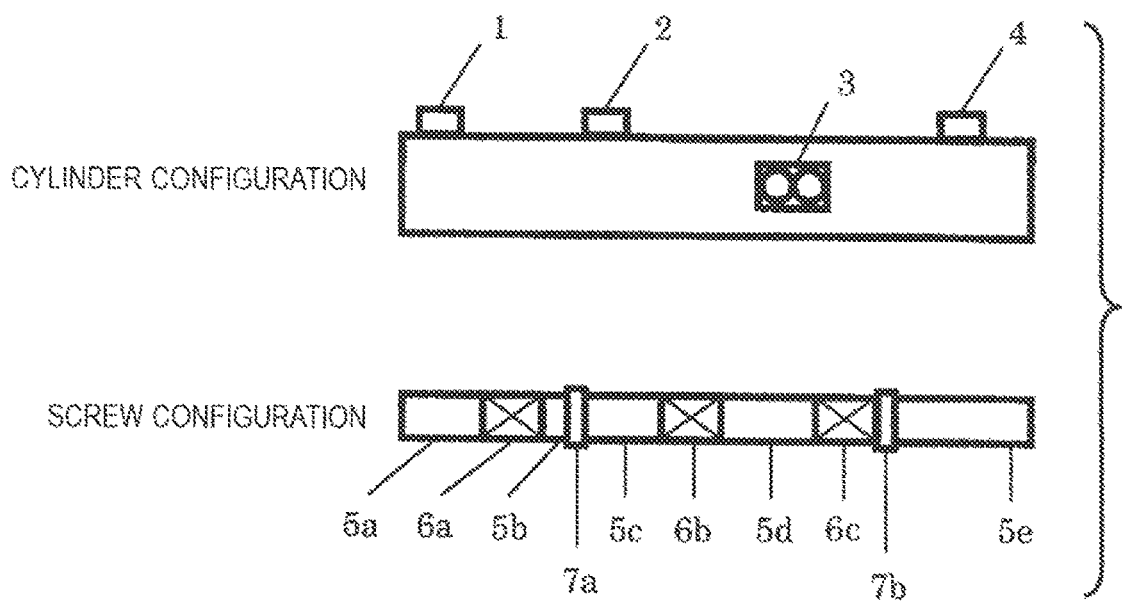

RESIN COMPOSITION, AND MOLDING MATERIAL AND MULTILAYER STRUCTURE COMPRISING SAME

CLAIM FOR PRIORITY

This application is a Continuation of PCT/JP2018/008641 filed Mar. 6, 2018, and claims the priority benefit of Japanese application 2017-041437 filed Mar. 6, 2017, the contents of which are expressly incorporated by reference herein in their entireties.

TECHNICAL FIELD

The present invention relates to a resin composition containing a saponified ethylene-vinyl ester-based copolymer (hereinafter, sometimes simply referred to as EVOH). The present invention also relates to a molding material composed of the resin composition and a multilayer structure having the resin composition layer.

BACKGROUND ART

In general, EVOH is known as a melt-moldable resin excellent in transparency, gas barrier property, aroma retentivity, solvent resistance, oil resistance, etc. and, by taking advantages of these properties, is utilized by molding it into, for example, a film or sheet for a food packaging material, a pharmaceutical product packaging material, an industrial chemical packaging material, an agrochemical packaging material, etc., or a container (molded product) such as bottle.

In order to impart higher gas barrier property to such EVOH, a technique of blending a water swellable layered inorganic compound or an inorganic filler is known (see, for example, Patent Documents 1 and 2). In the technique described in Patent Document 1, as concerns a resin composition containing EVOH and a water-swellable layered inorganic compound, use of a resin composition containing a specific amount of an alkaline earth metal fatty acid salt is disclosed for coping with a problem that, for example, many residual materials are generated during extrusion processing to cause streaks, etc. on the molded product or a difference is produced in the gas barrier property of the film after performing long-run molding for several hours. In the technique described in Patent Document 2, as concerns a resin composition containing EVOH and an inorganic filler, use of a resin composition having blended therein a special metal soap obtained by heating and reacting a specific aliphatic monocarboxylic acid with an oxide or hydroxide of Group 2 metal of the periodic table by a dry direct method is disclosed for coping with a problem that, for example, when melt molding is performed for a long period of time, aggregation of inorganic material particles proceeds within the molding machine to cause dispersion failure or the resin is likely to stay in the die due to the strong tendency of the viscosity to increase with time.

CITATION LIST

Patent Literature

Patent Document 1: JP-A-2000-26689
Patent Document 2: JP-A-2000-290457

SUMMARY OF INVENTION

Technical Problem

However, recent evolution of the package technology is accompanied by a complication of the layer configuration of a multilayer film or a requirement of reducing the film thickness of an EVOH resin composition layer, and further improvement of the processability in the technology above is being demanded. An object of the present invention is to provide a resin composition meeting such a requirement and having a higher level of processability.

Solution to Problem

As a result of intensive studies to solve those problems, the present inventors have found that the above-described object can be attained by blending a carbonic acid salt in a resin composition containing EVOH and a layered inorganic compound.

That is, the gist of the present invention resides in a resin composition characterized by containing a saponified ethylene-vinyl ester-based copolymer (A), a layered inorganic compound (B), and a carbonic acid salt (C). In addition, the present invention also provides a molding material composed of such a resin composition. Furthermore, the present invention provides a multilayer structure having a layer composed of such a resin composition.

Specifically, the present invention includes the following configurations (1) to (5).

(1) A resin composition comprising: a saponified ethylene-vinyl ester-based copolymer (A), a layered inorganic compound (B), and a carbonic acid salt (C) (provided that the carbonic acid salt (C) excludes the layered inorganic compound (B)).

(2) The resin composition according to (1), wherein the content of the carbonic acid salt (C) is, in terms of metal of the carbonic acid salt (C), from 10 to 1,000 ppm relative to the total amount of the saponified ethylene-vinyl ester-based copolymer (A) and the layered inorganic compound (B).

(3) The resin composition according to (1) or (2), wherein the weight ratio of the carbonic acid salt (C) to the layered inorganic compound (B) is from 0.001 to 0.3, with respect to (C)/(B).

(4) A molding material comprising the resin composition according to any one of (1) to (3).

(5) A multilayer structure including a layer comprising the resin composition according to any one of (1) to (3).

Advantageous Effects of Invention

The resin composition of the present invention and the molding material composed of the resin composition have remarkably excellent processability. Accordingly, a multilayer structure of excellent quality can be obtained with good productivity.

BRIEF DESCRIPTION OF DRAWINGS

The FIGURE is a side view illustrating a cylinder and a screw of a twin-screw extruder usable for implementing one embodiment of the present invention.

DESCRIPTION OF EMBODIMENTS

The configurations of the present invention are described in detail below, but these are one of the examples of the preferred embodiment. In the following, the present invention is described in detail.

<Description of Saponified Ethylene-Vinyl Ester-Based Copolymer (A)>

EVOH for use in the present invention is a water-insoluble resin and is obtained by saponifying a copolymer of ethylene and a vinyl ester monomer. The ethylene-vinyl ester copolymer is produced by any known polymerization method, for example, by solution polymerization, suspension polymerization, emulsion polymerization, etc., and the saponification of the ethylene-vinyl ester copolymer can also be performed by a known method.

As the vinyl ester-based monomer, typically, vinyl acetate is used in view of commercial availability and good impurity treatment efficiency. Other than this, the vinyl ester-based monomer includes, for example, an aliphatic vinyl ester such as vinyl formate, vinyl propionate, vinyl valerate, vinyl butyrate, vinyl isobutyrate, vinyl pivalate, vinyl caprate, vinyl laurate, vinyl stearate and vinyl versatate, and an aromatic vinyl ester such as vinyl benzoate, and is usually an aliphatic vinyl ester having from 3 to 20 carbon atoms, preferably from 4 to 10 carbon atoms, more preferably 4 to 7 carbon atoms. One of these vinyl esters is usually used alone, but a mixture of two or more thereof may be used, if desired.

The ethylene content in EVOH used in the present invention is, in terms of the ethylene structural unit content as measured in conformity with ISO 14663, from 20 to 60 mol %, preferably from 25 to 55 mol %, more preferably from 35 to 50 mol %, still more preferably from 38 to 48 mol %. If the ethylene structural unit content is too small, the flexibility of the obtained film tends to be reduced. On the other hand, if the ethylene structural unit content is too high, the gas barrier property is likely to become insufficient.

In addition, the saponification degree of the vinyl ester component is, in terms of the value as measured in conformity with JIS K6726 (provided that EVOH is in the form of a solution uniformly dissolved in a water/methanol solvent (water:methanol=9:1 (weight ratio)), usually 95 mol % or more, preferably from 95 to 100 mol %, more preferably from 98 to 100 mol %. If the saponification degree is low, the gas barrier property tends to be reduced.

Furthermore, the melt flow rate (MFR) of EVOH is, under the conditions of 210° C. and a load of 2,160 g, usually from 0.1 to 100 g/10 min, preferably from 0.5 to 50 g/10 min, more preferably from 1 to 20 g/10 min. If the value of MFR is too small, there is a tendency that the torque excessively rises during extrusion molding or vertical streaks are generated on the obtained film. On the other hand, if the value of MFR is too large, there is a tendency that the extrusion moldability becomes unstable or the thickness of the obtained film is uneven.

As the EVOH for use in the present invention, two or more types differing in the ethylene content, saponification degree or MFR may be mixed and used as long as they are EVOH satisfying the above-described requirements.

In addition, the EVOH for use in the present invention may be a copolymer having further copolymerized therein a small amount of a comonomer including, for example, an α-olefin such as propylene, isobutene, α-octene, α-dodecene and α-octadecene, hydroxyl group-containing α-olefins such as 3-buten-1-ol, 4-penten-1-ol and 3-butene-1,2-diol, hydroxymethylvinylidene acetates which are esterification products of the olefins above, such as 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, 1,3-diacetoxy-2-methylenepropane, 1,3-dipropionyloxy-2-methyleneproppane and 1,3-dibutylonyloxy-2-methylenepropane, glycerin monounsaturated alkyl ethers such as glycerin monoallyl ether, glycerin monovinyl ether and glycerin monoisopropenyl ether, an unsaturated carboxylic acid or its salt•partial alkyl ester•complete alkyl ester•nitrile•amide•anhydride, an unsaturated sulfonic acid or a salt thereof, a vinylsilane compound, vinyl chloride, and styrene. Furthermore, the copolymer may also be subjected to "post-modification" such as urethanation, acetalization, cyanoethylation, oxyalkylenation and epoxidization.

In particular, EVOH copolymerized with hydroxy group-containing α-olefins is preferred, because moldability and stretchability are improved.

In the EVOH for use in the present invention, as long as the effects of the present invention are not inhibited, a compounding agent generally blended in EVOH, such as thermal stabilizer, antioxidant, antistatic agent, colorant, ultraviolet absorber, lubricant, plasticizer, light stabilizer, surfactant, antibacterial agent, desiccant, anti-blocking agent, flame retardant, crosslinking agent, curing agent, foaming agent, crystal nucleating agent, antifogging agent, additive for biodegradation, silane coupling agent and oxygen absorbent, may be previously incorporated.

As the thermal stabilizer, for the purpose of enhancing various physical properties such as thermal stability during melt molding, there may be added additives including, for example, organic acids such as acetic acid, propionic acid, butyric acid, lauric acid, stearic acid, oleic acid and behenic acid, or salts thereof, such as alkaline earth metal salt (e.g., sodium, potassium), alkaline earth metal salt (e.g., calcium, magnesium) and metal salt belonging to the d block in the fourth period of the periodic table (e.g., zinc, copper); or inorganic acids such as sulfuric acid, sulfurous acid, phosphoric acid and boric acid, or salts thereof, such as alkaline earth metal salt (e.g., sodium, potassium), alkaline earth metal salt (e.g., calcium, magnesium) and metal salt belonging to the d block in the fourth period of the periodic table (e.g., zinc, copper). Among these, it is particularly preferable to add acetic acid, phosphoric acid, boric acid, a boron compound containing a salt thereof, an acetate, or a phosphate.

In the case of adding acetic acid, the amount added thereof is usually from 0.001 to 1 part by weight, preferably from 0.005 to 0.2 parts by weight, more preferably from 0.01 to 0.1 parts by weight, per 100 parts by weight of EVOH. If the amount added of acetic acid is too small, the effect due to containing acetic acid may not be obtained sufficiently, and conversely, if the amount added is too large, it tends to be difficult to obtain a film having uniform thickness or appearance.

In the case of adding phosphoric acid, the amount added thereof (after decomposition with sulfuric acid and nitric acid by heating, the phosphate radical is analyzed by atomic absorption method) is usually from 0.0005 to 0.1 parts by weight, preferably from 0.001 to 0.05 parts by weight, more preferably from 0.002 to 0.03 parts by weight, per 100 parts by weight of EVOH. If the amount added of phosphoric acid is too small, the effect due to containing phosphoric acid may not be obtained sufficiently, and conversely, if the amount added is too large, it tends to be difficult to obtain a film having uniform thickness or appearance.

In the case of adding a boron compound, the amount added thereof is, in terms of boron (after ashing, analyzed by ICP emission spectroscopy), usually from 0.001 to 1 part by weight, preferably from 0.002 to 0.2 parts by weight, more preferably from 0.005 to 0.1 parts by weight, per 100 parts by weight of EVOH. If the amount added of the boron compound is too small, the effect due to containing boric compound may not be obtained sufficiently, and conversely, if the amount added is too large, it tends to be difficult to obtain a film having uniform thickness or appearance.

The amount added of the acetate or phosphate (including a hydrogen phosphate salt) is, in terms of metal (after ashing, analyzed by ICP emission spectroscopy), usually from 0.0005 to 0.1 parts by weight, preferably from 0.001 to 0.05 parts by weight, more preferably from 0.002 to 0.03 parts by weight, per 100 parts by weight of EVOH. If the amount added is too small, the effect due to containing the salt may not be obtained sufficiently, and conversely, if the amount added is too large, the obtained film tends to be colored or emit an unusual odor. Incidentally, in the case of adding two or more kinds of salts to EVOH, the total amount thereof is preferably in the above-described range of the amount added.

<Description of Layered Inorganic Compound (B)>

The inorganic layered compound (B) as used in the present invention indicates a compound having a structure in which atoms are firmly bound by covalent bonding, etc. to form densely arrayed sheet-like materials and these sheet-like materials are stacked substantially parallel to each other by Van der Waals force, electrostatic force, etc. Typically, the compound includes a layered silicate. Such an inorganic layered compound may be either a natural product or a synthetic product.

The layered silicate is structured by a tetrahedron sheet in which tetrahedral crystals containing an inorganic element such as silicon or aluminum are two-dimensionally bonded, and an octahedron sheet in which octahedral crystals containing an inorganic element such as aluminum, magnesium or iron are two-dimensionally bonded.

The layered silicate in which the relationship of the tetrahedron sheet and the octahedron sheet is of 1:1 type includes a kaolin mineral and, specifically, includes kaolinite, halloysite, chrysotile, etc. The 2:1 type layered silicate includes talc, smectite, vermiculite, and mica such as isinglass and brittle mica, and the smectite includes montmorillonite and saponite. Other than these, this type includes hydrotalcite. In view of cost and availability, a 1:1 type layered silicate is preferred, a kaolin mineral is more preferably, and use of kaolinite is particularly preferred.

The kaolinite as an example for use in the present invention may be surface-treated with a reactant such as silane coupling agent. The silane coupling agent is represented by the formula: $RSiX_3$, wherein R is, for example, an organic functional group such as vinyl group, styryl group, epoxy group, glycidyl group, glycidoxy group, methacryl group, amino group and mercapto group, and X is mainly chlorine or an alkoxy group. As for the type of the silane coupling agent, the silane coupling agent includes, for example, aminosilane, vinylsilane, styrylsilane, epoxysilane, glycidylsilane, glycidoxysilane, methacrylsilane, and mercaptosilane, with aminosilane being preferred. Specific examples thereof include vinyltrimethoxysilane, vinyltriethoxysilane, p-styryltrimethoxysilane, 2-(3,4-epoxycyclohexyl)ethyltrimethoxysilane, 3-glycidyloxypropyltrime- thoxysilane, 3-glycidoxypropylmethyldiethoxysilane, 3-methacryloxypropylmethyldimethoxysilane, 3-aminopropyltrimethoxysilane, N-2-(aminoethyl)-3-aminopropylmethyldimethoxysilane, and 3-mercaptopropyltrimethoxysilane.

The particle diameter (μm) of the layered inorganic compound (B) for use in the present invention is usually from 0.01 to 30 μm, preferably from 0.01 to 10 μm, more preferably from 0.01 to 5 μm, in terms of the median diameter corresponding to 50% by volume fraction of primary particles in the particle size distribution (hereinafter, sometimes simply referred to as primary particle diameter) measured by forming a dispersion having a layered inorganic compound (B) concentration of 1 to 10 wt % in pure water as a solvent and using a laser diffraction•scattering particle size distribution measuring apparatus LA950 (manufactured by Horiba Ltd.). If the particle diameter is too large, the appearance of the molded product tends to deteriorate.

Incidentally, the primary particles of the layered inorganic compound (B) may form a secondary particle. In this case, the median diameter corresponding to 50% by a volume fraction of secondary particles in the particle size distribution measured by forming a dispersion having a layered inorganic compound (B) concentration of 1 to 10 wt % and using a laser diffraction•scattering particle size distribution measuring apparatus LA950 (manufactured by Horiba Ltd.) is usually from 0.1 to 60 μm, preferably from 1 to 30 μm more preferably from 5 to 15 μm. If this particle diameter is too large, the appearance of the molded product tends to deteriorate.

The surface area (B.E.T. $m^2/g$) of the kaolinite as an example for use in the present invention is usually 1 (B.E.T. $m^2/g$) or more, preferably 3 (B.E.T. $m^2/g$) or more, more preferably 5 (B.E.T. $m^2/g$) or more. In this case, the upper limit is usually 80 (B.E.T. $m^2/g$). If the surface area is too small, the dispersion stability tends to be reduced.

<Description of Carbonic Acid Salt (C)>

The present invention is characterized by blending a carbonic acid salt (C) in a composition containing the EVOH (A) and the layered inorganic compound (B). An effect of remarkably enhancing the processability is obtained by using the carbonic acid salt (C).

As the carbonic acid salt (C), a known metal carbonate can be used. The metal carbonate of the present invention encompasses a metal hydrogencarbonate but excludes the compounds recited as the layered inorganic compound (B).

Specifically, the metal carbonate includes an alkali metal salt such as sodium carbonate, sodium hydrogencarbonate, potassium carbonate and potassium hydrogencarbonate, and an alkaline earth metal salt such as magnesium carbonate and calcium carbonate. It is also possible to use two or more of these in combination.

Since it is preferable to be basic in view of dissolvability for EVOH, the carbonic acid salt (C) is preferably a double salt, more preferably a basic carbonate. Among others, in view of processability, an alkaline earth metal salt is preferred, a basic alkaline earth metal salt is more preferred, and a basic magnesium carbonate is still more preferred.

The particle diameter of the carbonic acid salt (C) is preferably smaller from the viewpoint of processability or suppressing stay in a molding machine such as various extruders. Favorably, the median diameter corresponding to 50% by volume fraction in the particle size distribution measured by a water-based powder addition method at the time of measurement of the particle size distribution by laser diffraction scattering method is usually 20 μm or less, preferably from 1 to 15 μm, more preferably from 3 to 10 μm. If this particle diameter is too large, the processability tends to deteriorate, and if it is too small, the handling may become difficult to reduce the productivity.

The ratio between the primary particle diameter (μm) of the layered inorganic compound (B) and the particle diameter (μm) of the carbonic acid salt (C), with respect to [primary particle diameter of layered inorganic compound (B)/particle diameter of carbonic acid salt (C)], is usually from 0.005 to 0.1, preferably from 0.008 to 0.08, more preferably from 0.01 to 0.05. When this value is in the range above, the effects of the present invention are likely to be obtained more efficiently.

<Resin Composition>

In the present invention, the resin component serving as the base is EVOH (A). The content of EVOH (A) in the resin composition of the present invention is usually 50 wt % or more, preferably from 70 to 99 wt %, more preferably from 80 to 92 wt %. A resin other than EVOH (A) (for example, a polyamide-based resin and a polyolefin-based resin) may be blended as long as it does not inhibit the effects of the present invention, but the blending amount thereof is usually less than 50 wt %, preferably less than 30 wt %, more preferably less than 20 wt %.

In the resin composition of the present invention, the weight ratio [(B)/(A)] of EVOH (A) and the layered inorganic compound (B) is usually from 1/99 to 50/50, preferably from 5/95 to 30/70, more preferably from 8/92 to 20/80. If this ratio is too small, the effects of the present invention tend to be difficult to obtain.

The resin composition of the present invention is characterized by using a layered inorganic compound (B) and a carbonic acid salt (C) in combination. The content of the carbonic acid salt (C) component is, in terms of metal, usually from 10 to 1,000 ppm, preferably from 100 to 800 ppm, more preferably from 300 to 700 ppm, still more preferably from 350 to 500 ppm, relative to the total amount of the EVOH (A) and the layered inorganic compound (B). If this amount is too small, the processability tends to deteriorate, and if it is too large, the productivity tends to be reduced.

The content of the carbonic acid salt (C) component relative to the layered inorganic compound (B), with respect to the weight ratio [(C)/(B)], is usually from 0.001 to 0.300, preferably from 0.005 to 0.025, more preferably from 0.010 to 0.020. If this amount is too small, the processability tends to deteriorate, and if it is too large, the productivity tends to be reduced.

As for the processability, the torque value (Nm) when 55 g of the resin composition pellet is charged into a torque detection-type rheometer ("Plasticoder PLE331", manufactured by Brabender, roller mixer: W50E) set at a temperature of 230° C. and after preheating for 5 minutes, melt-kneaded at a rotation speed of 50 rpm is measured over time (20 minutes and 120 minutes after the start of the melt-kneading), and in the measured values, the (T120/T20) ratio (torque value (T120) at 120 minutes after start of melt-kneading/torque value (T20) at 20 minutes after start of melt-kneading) is calculated to thereby evaluate the processability. The (T120/T20) ratio is usually from 0.03 to 0.60, preferably from 0.05 to 0.50, more preferably from 0.07 to 0.35. If this value is too small, the productivity tends to be reduced, and if it is too large, the processability tends to deteriorate.

<Production Method of Resin Composition>

The method for preparing the resin composition of the present invention is not particularly limited but includes, for example, (1) a method in which respective components are dry blended, (2) a method in which other components are blended in a solution of EVOH (A), and (3) a method in which other components are blended with EVOH (A) in a molten state.

Among others, the method of (3) includes (i) a method in which an aqueous dispersion of the layered inorganic compound is blended with EVOH, and (ii) a method in which the layered inorganic compound (B) is blended with hydrous EVOH previously soaked in water.

The method of (3) is preferred in view of productivity and handleability, and the method of (i) is more preferred from the viewpoint of uniformly dispersing the layered inorganic compound in the EVOH resin.

Furthermore, the method of (3) (i) includes, specifically, (1) a method in which a mixture prepared by previously blending the EVOH resin (A) and an aqueous dispersion of the layered inorganic compound (B) is fed to a hopper of the extruder above, (2) a method in which the EVOH resin (A) and an aqueous dispersion of the layered inorganic compound (B) are directly fed to the extruder, (3) a method in which the EVOH resin (A) is fed to a hopper of the extruder and at the same time, an aqueous dispersion of the layered inorganic compound (B) is fed from a part of a barrel of the extruder (side feeding), etc. In performing the method of (3), the aqueous dispersion may be fed from a vent port by utilizing the gravity or by applying a pressure.

The temperature of the resin composition in the die at the time of conducting kneading is not particularly limited but is preferably set to be 120 to 300° C. (more preferably from 150 to 280° C.) by controlling the extrusion conditions (e.g., preset temperature, screw shape, screw rotation speed). If this temperature is too low, the extrusion may become unstable and conversely, if it is too high, the quality of the resin composition may be disadvantageously reduced (thermal degradation).

The temperature of the resin composition may be determined by applying a temperature measured by a temperature sensor provided in a cylinder of the extruder. The installation location of the temperature sensor is suitably arranged in the vicinity of a discharge port at a tip of the extruder.

The screw rotation speed is selected in the range of 10 to 1000 rpm (furthermore, from 30 to 600 rpm). If the rotation speed is too low, the productivity tends to be reduced, and conversely, if it is too high, the quality of the resin composition tends to deteriorate (thermal degradation).

The rate of charging of the EVOH resin (A) may be arbitrarily determined according to the barrel diameter of the extruder, etc. In addition, as for the rate of charging of the layered inorganic compound (B), the compound may be fed according to the EVOH resin (A) so as to satisfy the blending amount, etc. of the layered inorganic compound (B) in the intended resin composition.

The residence time (kneading time) of the resin composition in the extruder is selected in the range of usually from 10 to 300 seconds, preferably from 50 to 300 seconds, more preferably from 100 to 300 seconds. If the residence time is too short, the kneading tends to become insufficient, leading to reduction in the dispersibility of the layered inorganic compound (B) and reduction in the dehydration efficiency, and on the other hand, if the residence time is too long, the resin tends to suffer from deterioration due to heat.

The pressure applied to the composition (resin pressure) is preferably selected in the range of 0.5 to 30 MPa, more preferably from 1 to 20 MPa. If the pressure is too low or high, the extrusion tends to be unstable. In addition, it is also preferable to place the inside of the hopper and the periphery of the vent under nitrogen seal so as to prevent thermal degradation of the resin composition.

The moisture content of the resin composition immediately after discharge from the extruder is less than 5 wt %, preferably 2 wt % or less, more preferably 0.5 wt % or less, and this is advantageous in that troubles such as foaming during melt molding (e.g., extrusion molding, injection molding) after drying can be reduced. Usually, the lower limit of the moisture content is 0.01 wt %.

Furthermore, after the resin composition having a moisture content of less than 5 wt % is obtained by the above-described method, a drying treatment (e.g., hot air drying, induction heating and drying, microwave irradiation and drying) can also be performed in combination for the purpose of readjustment, etc. of the moisture content of the resin composition.

The method for pelletizing the resin composition discharged from the extruder includes, for example, a method in which a strand-like material obtained by extruding the heat-melted resin composition and then cooling and solidifying it is cut into a given size by means of a strand cutter to produce cylindrical EVOH resin composition pellets (strand cutting method), and a method in which the resin composition heat-melted in the extruder is extruded into a solidification liquid from a discharge port and cut into a given size in the melted state by means of a cutter to produce spherical EVOH resin composition pellets by utilizing surface tension at the time of solidification (a underwater cutting method or a hot cutting method such as in-air cutting method).

In the resin composition obtained by the production method of the present invention, if desired, various additives such as plasticizer, heat stabilizer, light stabilizer, ultraviolet absorber, anti-aging agent, pigment, colorant, natural fiber, various inorganic particles, various fillers, antistatic agent, release agent, plasticizing agent, fragrance, lubricant, crosslinking (vulcanizing) agent, crosslinking (vulcanization) accelerator, crystal nucleating agent, crystallization accelerator, flame retardant, blowing agent, softening agent, antiseptic agent and antibacterial/antifungal agent may be blended according to the purpose during mixing or kneading of raw materials or during molding.

The resin composition obtained by the production method of the present invention is often used for molded product applications and can be molded into various molded products such as film, sheet, container, fiber, rod and pipe by melt molding, etc. In addition, a pulverized product thereof (for example, when reusing the recycled material) can be again subjected to melt molding. As for such a melt-molding method, an extrusion molding method (e.g., T-die extrusion, inflation extrusion, blow-molding, melt-spinning, profile extrusion), and an injection molding method are mainly employed. The melt-molding temperature is selected in the range of 150 to 300° C. in many cases.

The resin composition obtained by the production method of the present invention may be used as a single-body molded product but may also be used for a multilayer-structure molded product, and specifically, it is useful to use the molded product in the form of a multilayer structure in which a thermoplastic resin layer, etc. is stacked on at least one surface of a layer composed of the resin composition. In producing the multilayer structure, another base material is stacked on one surface or both surfaces of a layer composed of the resin composition, and the stacking method includes, for example, a method in which a thermoplastic resin is melt-extruded onto a film or sheet composed of the resin composition, a method in which, conversely, the resin composition is melt-extruded onto a base material such as thermoplastic resin, a method in which the resin composition and another thermoplastic resin are coextruded, and a method in which a film or sheet composed of the resin composition of the present invention and a film or sheet of another base material are dry-laminated together by using an adhesive agent such as organic titanium compound, isocyanate compound, polyester-based compound and polyurethane compound. In addition, the resin composition obtained by the production method of the present invention is also preferably used for coextrusion molding.

In the case of coextrusion, the other resin includes, for example, a polyolefin-based resin, a polyester-based resin, a polyamide-based resin, a copolymerized polyamide, a polystyrene-based resin, a polyvinyl chloride-based resin, polyvinylidene chloride, an acrylic resin, a vinyl ester-based resin, a polyester elastomer, a polyurethane elastomer, chlorinated polyethylene, chlorinated polypropylene, an aromatic or aliphatic polyketone, and an aliphatic polyalcohol, and a polyolefin-based resin is suitably used.

The polyolefin-based resin includes, specifically, an olefin homopolymer or copolymer such as linear low-density polyethylene (LLDPE), low-density polyethylene (LDPE), very-low-density polyethylene (VLDPE), medium-density polyethylene (MDPE), high-density polyethylene (HDPE), ethylene-vinyl acetate copolymer (EVA), ionomer, ethylene-propylene (block or random) copolymer, ethylene-acrylic acid copolymer, ethylene-acrylic acid ester copolymer, ethylene-methacrylic acid copolymer, ethylene-methacrylic acid ester copolymer, polypropylene, propylene-α-olefin (α-olefin having from 4 to 20 carbon atoms) copolymer, polybutene, polypentene and polymethylpentene; and a polyolefin-based resin in a broader sense, such as a resin obtained by graft-modifying the olefin homopolymer or copolymer above with an unsaturated carboxylic acid or its ester, and a blend thereof, and among these, a linear low-density polyethylene (LLDPE), a low-density polyethylene (LDPE), a very-low-density polyethylene (VLDPE), an ethylene-vinyl acetate copolymer (EVA), and an ionomer are preferred because of excellent flexural fatigue resistance and vibration fatigue resistance of the resulting laminated packaging material.

Furthermore, in the case where a molded product such as film or sheet is once formed from the resin composition obtained by the production method of the present invention and then extrusion-coated with another base material or in the case of laminating a film, a sheet, etc. of another base material by using an adhesive agent, other than the thermoplastic resin above, any base material (e.g., paper, metal foil, unstretched or uniaxially or biaxially stretched plastic film or sheet, the film or sheet vapor-deposited with an inorganic compound, woven fabric, nonwoven fabric, metal floc, wood) can be used.

As for the layer configuration of the multilayer structure, denoting a (a1, a2, . . . ) as the layer composed of the resin composition obtained by the production method of the present invention and b (b1, b2, . . . ) as the other base material, for example, a thermoplastic resin layer, in the case of a film, a sheet or a bottle shape, not only a two-layer structure a/b but also any combination such as b/a/b, a/b/a, a1/a2/b, a/b1/b2, b2/b1/a/b1/b2, b1/b2/a/b3/b4 and a1/b1/a2/b2 can be employed, and in the case of a filament shape, any combination such as a and b being bimetal type, core (a)-sheath (b) type, core (b)-sheath (a) type or eccentric core-sheath type can be employed.

Incidentally, in the layer configuration above, an adhesive resin layer may be provided between respective layers, if desired, and as the adhesive resin, various adhesive resins can be used. The adhesive resin varies depending on the type of the resin of b and cannot be indiscriminately specified but includes a carboxyl group-containing modified olefin-based polymer obtained by chemically bonding an unsaturated carboxylic acid or its anhydride to an olefin-based polymer (the above-described polyolefin-based resin in a broader sense) through an addition reaction, a graft reaction, etc. Specifically, preferred examples thereof include one or a mixture of two or more selected from a maleic anhydride-graft-modified polyethylene, a maleic anhydride-graft-modified polypropylene, a maleic anhydride-graft-modified ethylene-propylene (block or random) copolymer, a maleic anhydride-graft-modified ethylene-ethyl acrylate copolymer, and a maleic anhydride-graft-modified ethylene-vinyl acetate copolymer, etc.

At this time, the amount of the unsaturated carboxylic acid or its anhydride contained in the olefin-based polymer is preferably from 0.001 to 3 wt %, more preferably 0.01 to 1 wt %, still more preferably from 0.03 to 0.5 wt %. If the modified amount in the modification product above is small, the adhesive property may become insufficient, and conversely, if the modified amount is large, a crosslinking reaction may be caused, reading to a reduction in the moldability. In addition, it is also possible to blend, in the adhesive resin, the resin composition obtained by the production method of the present invention, other EVOH resin, a rubber•elastomer component such as polyisobutylene or ethylene-propylene rubber, the resin of the layer b, etc. In particular, blending of a polyolefin-based resin different from the polyolefin-based resin as a matrix of the adhesive resin is useful, because the adhesive property may be enhanced.

The thicknesses of each layer of the multilayer structure varies depending on the layered configuration, the type of b, the intended use, the container shape and the required physical properties and cannot be indiscriminately specified, but, usually, the thickness is selected in the range of 0.5 to 300 μm (furthermore, from 1 to 200 μm) for a, in the range of 5 to 3,000 μm (furthermore, from 10 to 2,000 μm) for b, and in the range of approximately from 0.5 to 300 μm (furthermore, from 1 to 200 μm) for the adhesive resin layer. If a is too thin, the gas barrier property is reduced or the thickness control becomes unstable, and conversely, if the layer is too thick, this disadvantageously causes a reduction in the flexural fatigue resistance and at the same time, is not profitable. If b is too thin, the rigidity is reduced, and conversely, if the layer is too thick, this disadvantageously causes a reduction in the flexural fatigue resistance and an increase in the weight. If the adhesive resin layer is too thin, the interlayer adhesion is reduced or the thickness control becomes unstable, and conversely, if the layer is too thick, this disadvantageously causes an increase in the weight and at the same time, is not profitable. In addition, in each layer of the multilayer structure, the above-described various additives, a modifier, a filler, other resins, etc. may be added for enhancing molding processability and all kinds of physical properties, as long as they do not inhibit the effects of the present invention.

The multilayer structure is used directly for various shapes but in order to improve the physical properties of the multilayer structure, it is also preferable to apply a stretching treatment. The stretching may be either uniaxial stretching or biaxial stretching. Stretching at as a high ratio as possible is advantageous in view of physical properties, and a stretched film, a stretched sheet, a stretched container, a stretched bottle, and other molded products free from pinholes, cracking, uneven stretching, delamination, etc. during stretching are obtained.

As the stretching method, a roll stretching method, a tenter stretching method, a tubular stretching method, a stretch-blowing method, etc. and out of deep-draw molding, vacuum-pressure molding, etc., a method of high stretch ratio can be employed. In the case of biaxial stretching, either method of a simultaneous biaxial stretching method or a sequential biaxial stretching method may be employed. The stretching temperature is selected in the range of 50 to 170° C., preferably from 60 to 160° C.

It is also preferable to perform heat setting after the completion of stretching. The heat setting can be conducted by known means, and a heat treatment is performed usually at 80 to 300° C., preferably at 100 to 280° C., for approximately from 1 to 600 seconds while keeping the stretched film above in tension. For example, in the case of obtaining a cup- or tray-shaped multilayer container from a multilayer sheet or a multilayer film, a draw forming method is employed, and specifically, the method includes a vacuum forming method, a pressure forming method, a vacuum-pressure forming method, a plug-assisted vacuum-pressure forming method, etc.

Furthermore, in the case of obtaining a tubular or bottle-shaped multilayer container from a multilayer parison (a hollow tubular preform before blowing), a blow molding method is employed, and specifically, the method includes an extrusion blow molding method (e.g., double head, mold transfer, parison shift, rotary, accumulator, horizontal parison), a cold-parison blow molding method, an injection blow molding method, a biaxial-stretching blow molding method (e.g., extrusion cold-parison biaxial-stretching blow molding method, injection cold-parison biaxial-stretching blow molding method, in-line injection biaxial-stretching blow molding method), etc.

In addition, in the case of using the multilayer structure for the heat-shrink packaging application of raw meat, processed meat, cheese, etc., the multilayer structure is used as a product film without performing heat setting after stretching, the raw meat, processed meat, cheese, etc. is packaged in the film, and the package is then heat-treated usually at 50 to 130° C., preferably at 70 to 120° C., for approximately from 2 to 300 seconds to heat-shrink the film for tight packaging.

The shape of the thus-obtained multilayer structure may be any shape, and examples thereof include a film, a sheet, a tape, a bottle, a pipe, a filament, and a profile extrusion product. In addition, the obtained multilayer structure may be subjected, if desired, to heat treatment, cooling treatment, rolling treatment, printing treatment, dry lamination treatment, solution or melt coating treatment, bag making process, deep drawing process, box making process, tube making process, splitting process, etc.

A container composed of a cup, a tray, a tube, a bottle, etc. obtained as above and a bag or cap composed of the stretched film are useful as various containers for general foods, seasonings such as mayonnaise and dressing, fermented foods such as soy-bean paste, fat and oil foods such as salad oil, beverages, cosmetics, medical supplies, detergents, perfumes, industrial chemicals, agricultural chemicals, fuels, etc., but above all, the multilayer structure of the present invention is useful for the heated and stretch-formed container application, for example, a cup-shaped container for semisolid foods•seasonings such as jelly, pudding, yogurt, mayonnaise and soy-bean paste, and a tray-shaped container for raw meat and processed meat product (e.g., ham, bacon, Vienna sausage).

EXAMPLE

The present invention is described more specifically below by referring to Examples, but the present invention is not limited to the following Examples as long as the gist thereof is observed. Incidentally, unless otherwise indicated, the "parts" and "%" in Examples are on the weight basis.
<Evaluation>

<Processability>

The torque value (Nm) when 55 g of the resin composition pellet was charged into a torque detection-type rheometer ("Plasticoder PLE331", manufactured by Brabender, roller mixer: W50E) set at a temperature of 230° C., preheated for 5 minutes and then melt-kneaded at a rotation speed of 50 rpm was measured over time (20 minutes and 120 minutes after the start of the melt-kneading). Denoting (T20) as the torque value at 20 minutes after the start of melt-kneading and (T120) as the torque value at 120 minutes after the start of melt-kneading, the (T120/T20) ratio was calculated.

Example 1

<Production of Resin Composition Pellet>

A saponified ethylene-vinyl acetate copolymer (a1) (ethylene content: 29.4 mol %, saponification degree: 99.7 mol %, MFR: 3.7 g/10 min (210° C., load: 2,160 g)) was used as EVOH (A), kaolinite (the median diameter corresponding to 50% by volume fraction of primary particles in the particle size distribution measured by a laser diffraction•scattering particle size distribution measuring apparatus LA950 (manufactured by Horiba Ltd.) is 0.15 μm) was used as the layered inorganic compound (B), and magnesium carbonate (basic magnesium carbonate, which is light and represented by $xMgCO_3 \cdot yMg(OH)_2 \cdot zH_2O$, wherein each of x, y and z is an integer; the median diameter corresponding to 50% by volume fraction in the particle size distribution measured by a water-based powder addition method at the time of measurement of the particle size distribution by laser diffraction scattering method is 6 μm) was used as the carbonic acid salt (C).

20 Parts of the inorganic layered compound (B) and 80 parts of distilled water were charged into a container and stirred at room temperature until aggregates of the inorganic layered compound (B) were not observed, and an aqueous dispersion (solid content concentration: 20%) of the inorganic layered compound (B) was thereby obtained. The EVOH (A) and the aqueous dispersion of the inorganic layered compound (B) were mixed under the following conditions by using a twin-screw extruder, and the mixture was extruded in strand form and cut to obtain cylindrical pellets. The pellet contained 88 parts of EVOH (A) and 12 parts of the inorganic layered compound (B) per 100 parts of the pellet.

<Compounding Conditions>

88 Parts of the EVOH (A) was charged through a raw material feeding part 1 of a twin-screw extruder [L/D=56, 32 mmϕ, FIGURE] having a screw configuration composed of full-flight screw parts 5a, 5b, 5c, 5d and 5e, kneading parts 6a, 6b and 6c, and seal rings 7a and 7b and including a cylinder provided with a dispersion pressure-injection part 2, a screw-type side feeder 3, and a vacuum vent 4, illustrated in the FIGURE, and after the EVOH resin was brought into a melted state at a temperature of 230° C., 60 parts of the above-obtained aqueous dispersion (solid content concentration: 20%) of the inorganic layered compound (B) was continuously pressure-injected through a dispersion pressure-injection part 2, followed by kneading (slurry method). The EVOH resin composition after kneading was extruded in strand form into a water bath and cut by a pelletizer to prepare EVOH resin composition pellets.

Incidentally, the screw-type side feeder had L/D=8.3 and a screw inner diameter=28 mmϕ and was used in an open atmosphere state. The rotation speed of the screw of the screw-type side feeder was 100 rpm.

The carbonic acid salt (C) was blended with the obtained cylindrical pellets to give a concentration of 1,360 ppm (350 ppm in terms of magnesium) and dry blended to obtain the resin composition of the present invention.

The content of the carbonic acid salt (C) in the obtained resin composition was, in terms of the metal of the carbonic acid salt (C), 350 ppm relative to the total amount of EVOH (A) and the layered inorganic compound (B). In addition, the weight ratio of the carbonic acid salt (C) to the layered inorganic compound (B) in the obtained resin composition, with respect to (C)/(B), was 0.011.

The obtained resin composition was subjected to the above-described evaluation. The results are shown in Table 1.

Example 2

<Production of Resin Composition Pellet>

A saponified ethylene-vinyl acetate copolymer (a2) (ethylene content: 29.6 mol %, saponification degree: 99.7 mol %, MFR: 3.8 g/10 min (210° C., load: 2,160 g)) was used as EVOH (A), kaolinite (the median diameter corresponding to 50% by volume fraction of primary particles in the particle size distribution measured by a laser diffraction•scattering particle size distribution measuring apparatus LA950 (manufactured by Horiba Ltd.) is 0.15 μm) was used as the layered inorganic compound (B), and magnesium carbonate (basic magnesium carbonate, which is light and represented by $xMgCO_3 \cdot yMg(OH)_2 \cdot zH_2O$, wherein each of x, y and z is an integer; the median diameter corresponding to 50% by volume fraction in the particle size distribution measured by a water-based powder addition method at the time of measurement of the particle size distribution by laser diffraction scattering method is 6 μm) was used as the carbonic acid salt (C).

20 Parts of the inorganic layered compound (B) and 80 parts of distilled water were charged into a container and stirred at room temperature until aggregates of the inorganic layered compound (B) were not observed, and an aqueous dispersion (solid content concentration: 20%) of the inorganic layered compound (B) was thereby obtained. Using the EVOH (A), the aqueous dispersion of the inorganic layered compound (B) and the carbonic acid salt (C), the carbonic acid salt (C) was blended with 88 parts of EVOH (A) and 12 parts of the inorganic layered compound (B) to give a concentration of 1,540 ppm (400 ppm in terms of magnesium) and mixed under the following conditions by using a twin-screw extruder, and the mixture was extruded in strand form and cut to obtain cylindrical resin composition pellets.

The content of the carbonic acid salt (C) in the obtained resin composition was, in terms of the metal of the carbonic acid salt (C), 400 ppm relative to the total amount of EVOH (A) and the layered inorganic compound (B). In addition, the weight ratio of the carbonic acid salt (C) to the layered inorganic compound (B) in the obtained resin composition, with respect to (C)/(B), was 0.013.

<Compounding Conditions>

88 Parts of the EVOH (A) and 1,540 ppm (400 ppm in terms of magnesium) of the carbonic acid salt (C) were charged through a raw material feeding part 1 of a twin-screw extruder [L/D=56, 32 mmϕ, FIGURE] having a screw configuration composed of full-flight screw parts 5a, 5b, 5c, 5d and 5e, kneading parts 6a, 6b and 6c, and seal rings 7a and 7b and including a cylinder provided with a dispersion pressure-injection part 2, a screw-type side feeder 3, and a vacuum vent 4, illustrated in the FIGURE, and after the EVOH resin was brought into a melted state at a temperature of 230° C., 60 parts of the above-obtained aqueous dispersion (solid content concentration: 20%) of the inorganic layered compound (B) was continuously pressure-injected through a dispersion pressure-injection part 2, followed by kneading (slurry method). The EVOH resin composition after kneading was extruded in strand form into a water bath and cut by a pelletizer to prepare EVOH resin composition pellets.

Incidentally, the screw-type side feeder 3 had L/D=8.3 and a screw inner diameter=28 mmφ and was used in an open atmosphere state. The rotation speed of the screw of the screw-type side feeder was 100 rpm.

The obtained resin composition was subjected to the above-described evaluation. The results are shown in Table 1.

Example 3

<Production of Resin Composition Pellet>

A saponified ethylene-vinyl acetate copolymer (a1) (ethylene content: 29.4 mol %, saponification degree: 99.7 mol %, MFR: 3.7 g/10 min (210° C., load: 2,160 g)) was used as EVOH (A), an aqueous dispersion (solid content concentration: 73%) of kaolinite (the median diameter corresponding to 50% by volume fraction of primary particles in the particle size distribution measured by a laser diffraction•scattering particle size distribution measuring apparatus LA950 (manufactured by Horiba Ltd.) is 0.15 μm) was used as the layered inorganic compound (B), and magnesium carbonate (basic magnesium carbonate, which is light and represented by $xMgCO_3 \cdot yMg(OH)_2 \cdot zH_2O$, wherein each of x, y and z is an integer; the median diameter corresponding to 50% by volume fraction in the particle size distribution measured by a water-based powder addition method at the time of measurement of the particle size distribution by laser diffraction scattering method is 6 μm) was used as the carbonic acid salt (C).

The EVOH (A) and the aqueous dispersion of the inorganic layered compound (B) were mixed under the following conditions by using a twin-screw extruder, and the mixture was extruded in strand form and cut to obtain cylindrical resin composition pellets. The pellet contained 88 parts of EVOH (A) and 12 parts of the inorganic layered compound (B) per 100 parts of the pellet.

<Compounding Conditions>

88 Parts of the EVOH (A) was charged through a raw material feeding part 1 of a twin-screw extruder [L/D=56, 32 mmφ, FIGURE] having a screw configuration composed of full-flight screw parts 5a, 5b, 5c, 5d and 5e, kneading parts 6a, 6b and 6c, and seal rings 7a and 7b and including a cylinder provided with a dispersion pressure-injection part 2, a screw-type side feeder 3, and a vacuum vent 4, illustrated in FIGURE, and after the EVOH resin was brought into a melted state at a temperature of 230° C., 60 parts of the above-obtained aqueous dispersion (solid content concentration: 20%) of the inorganic layered compound (B) was continuously pressure-injected through a dispersion pressure-injection part 2, followed by kneading (slurry method). The EVOH resin composition after kneading was extruded in strand form into a water bath and cut by a pelletizer to prepare EVOH resin composition pellets.

Incidentally, the screw-type side feeder 3 had L/D=8.3 and a screw inner diameter=28 mmφ and was used in an open atmosphere state. The rotation speed of the screw of the screw-type side feeder was 100 rpm.

The carbonic acid salt (C) was blended with the obtained cylindrical pellets to give a concentration of 775 ppm (200 ppm in terms of magnesium) and dry blended to obtain the resin composition of the present invention.

The content of the carbonic acid salt (C) in the obtained resin composition was, in terms of the metal of the carbonic acid salt (C), 200 ppm relative to the total amount of EVOH (A) and the layered inorganic compound (B). In addition, the weight ratio of the carbonic acid salt (C) to the layered inorganic compound (B) in the obtained resin composition, with respect to (C)/(B), was 0.007.

The obtained resin composition was subjected to the above-described evaluation. The results are shown in Table 1.

Example 4

A resin composition was obtained in the same manner as in Example 3 except for making changes such that the content of the carbonic acid salt (C) in the obtained resin composition was, in terms of the metal of the carbonic acid salt (C), 450 ppm relative to the total amount of EVOH (A) and the layered inorganic compound (B) and the weight ratio of the carbonic acid salt (C) to the layered inorganic compound (B) in the obtained resin composition, with respect to (C)/(B), was 0.015.

The obtained resin composition was subjected to the above-described evaluation. The results are shown in Table 1.

Example 5

A resin composition was obtained in the same manner as in Example 3 except for making changes such that the content of the carbonic acid salt (C) in the obtained resin composition was, in terms of the metal of the carbonic acid salt (C), 900 ppm relative to the total amount of EVOH (A) and the layered inorganic compound (B) and the weight ratio of the carbonic acid salt (C) to the layered inorganic compound (B) in the obtained resin composition, with respect to (C)/(B), was 0.029.

The obtained resin composition was subjected to the above-described evaluation. The results are shown in Table 1.

Comparative Example 1

Cylindrical pellets were obtained in the same manner as in Example 1. A resin composition was obtained in the same manner by blending, in place of the carbonic acid salt (C), magnesium acetate with the obtained cylindrical pellets to give a concentration of 2,062 ppm (350 ppm in terms of magnesium). The content of the carbonic acid salt (C) in the obtained resin composition was, in terms of the metal of the carbonic acid salt (C), 350 ppm relative to the total amount of EVOH (A) and the layered inorganic compound (B). In addition, the weight ratio of the carbonic acid salt (C) to the layered inorganic compound (B) in the obtained resin composition, with respect to (C)/(B), was 0.017.

The obtained resin composition was subjected to the above-described evaluation. The results are shown in Table 1.

Comparative Example 2

Cylindrical pellets were obtained in the same manner as in Example 1. A resin composition was obtained in the same manner by blending, in place of the carbonic acid salt (C), basic magnesium 12-hydroxystearate (a salt represented by $\alpha MgO \cdot Mg(C_6H_{13} \cdot CH(OH) \cdot C_{10}H_{20} \cdot COO)_2$ (wherein $\alpha$ is a number from 0.1 to 1.0)) with the obtained cylindrical pellets to give a concentration of 8,800 ppm (475 ppm in terms of magnesium). The content of the carbonic acid salt (C) in the obtained resin composition was, in terms of the metal of the carbonic acid salt (C), 475 ppm relative to the total amount of EVOH (A) and the layered inorganic compound (B). In addition, the weight ratio of the carbonic acid salt (C) to the layered inorganic compound (B) in the obtained resin composition, with respect to (C)/(B), was 0.073.

The obtained resin composition was subjected to the above-described evaluation. The results are shown in Table 1.

Comparative Example 3

A resin composition was obtained in the same manner as in Example 1 except that the carbonic acid salt (C) was not used, and the same evaluation was performed. The results are shown in Table 1.

Comparative Example 4

A resin composition was obtained in the same manner as in Example 3 except that the layered inorganic compound (B) was not used and the content of the carbonic acid salt (C) in the obtained resin composition was changed, in terms of the metal of the carbonic acid salt (C), to 450 ppm relative to the amount of EVOH (A).

The obtained resin composition was subjected to the above-described evaluation. The results are shown in Table 1.

Example 4, and was 0.05 in Example 5, and thus, the ratio showed a significantly low value.

In addition, in Comparative Example 4 using only EVOH and a carbonic acid salt, the (T120)/(T20) ratio was 0.00, and thus, the productivity was greatly reduced.

It is apparent from these results that when a carbonic acid salt (C) is blended, the effect of decreasing the viscosity with time is markedly excellent and very excellent processability is achieved.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2017-041437) filed on Mar. 6, 2017, the contents of which are incorporated herein by way of reference.

INDUSTRIAL APPLICABILITY

The resin composition of the present invention and the molding material composed thereof have remarkably excellent processability. Accordingly, a multilayer structure of high quality can be obtained with good productivity.

REFERENCE SIGNS LIST

1: Raw material feeding part
2: Dispersion pressure-injection part
3: Side feeder
4: Vacuum vent
5a, 5b, 5c, 5d and 5e: Full-flight screw part
6a, 6b and 6c: Kneading part
7a and 7b: Seal ring

TABLE 1

| | Layered Inorganic Compound (B) | Carbonic acid salt (C) | Blending Amount of carbonic acid salt (C) (in terms of metal: ppm) | Processability | | |
|---|---|---|---|---|---|---|
| | | | | T20 (Nm) | T120 (Nm) | (T120)/(T20) Ratio |
| Example 1 | kaolinite | magnesium carbonate | 350 | 8.55 | 2.17 | 0.25 |
| Example 2 | kaolinite | magnesium carbonate | 400 | 7.34 | 1.46 | 0.20 |
| Example 3 | kaolinite | magnesium carbonate | 200 | 8.57 | 3.29 | 0.38 |
| Example 4 | kaolinite | magnesium carbonate | 450 | 5.15 | 0.52 | 0.10 |
| Example 5 | kaolinite | magnesium carbonate | 900 | 2.78 | 0.13 | 0.05 |
| Comparative Example 1 | kaolinite | magnesium acetate | 350 | 8.00 | 5.51 | 0.69 |
| Comparative Example 2 | kaolinite | basic magnesium 12-hydroxystearate | 475 | 7.85 | 5.50 | 0.70 |
| Comparative Example 3 | kaolinite | — | — | 10.09 | 22.76 | 2.26 |
| Comparative Example 4 | — | magnesium carbonate | 450 | 0.40 | 0.00 | 0.00 |

In Comparative Example 3 using only EVOH and an inorganic compound, the (T120)/(T20) ratio was 2.26 and showed a large value. In Comparative Example 1 using an acetate in addition, the (T120)/(T20) ratio was 0.69 and in Comparative Example 2 using basic magnesium 12-hydroxystearate, the (T120)/(T20) ratio was 0.70, revealing that the ratio was low and the processability was improved.

On the other hand, the (T120)/(T20) ratio was 0.25 in Example 1 using the resin composition of the present invention where a carbonic acid salt (C) was blended, was 0.20 in Example 2, was 0.38 in Example 3, was 0.10 in

The invention claimed is:

1. A resin composition comprising: a saponified ethylene-vinyl ester-based copolymer (A), a layered inorganic compound (B), and a carbonic acid salt (C), provided that the carbonic acid salt (C) excludes the layered inorganic compound (B),
   wherein the content of the carbonic acid salt (C) is, in terms of metal of the carbonic acid salt (C), from 10 to 1,000 ppm relative to the total amount of the saponified ethylene-vinyl ester-based copolymer (A) and the layered inorganic compound (B).

2. The resin composition according to claim 1, wherein the weight ratio of the carbonic acid salt (C) to the layered inorganic compound (B) is from 0.001 to 0.3, with respect to (C)/(B).

3. A molding material comprising the resin composition according to claim 1.

4. A multilayer structure comprising a layer comprising the resin composition according to claim 1.

* * * * *